(12) United States Patent
Bulkowski et al.

(10) Patent No.: US 10,528,254 B2
(45) Date of Patent: Jan. 7, 2020

(54) METHODS AND SYSTEMS OF GARBAGE COLLECTION AND DEFRAGMENTATION IN A DISTRIBUTED DATABASE

(71) Applicants: Brian J. Bulkowski, Menlo Park, CA (US); Venkatachary Srinivasan, Sunnyvale, CA (US)

(72) Inventors: Brian J. Bulkowski, Menlo Park, CA (US); Venkatachary Srinivasan, Sunnyvale, CA (US)

(*) Notice: Subject to any disclaimer, the term of this patent is extended or adjusted under 35 U.S.C. 154(b) by 0 days.

(21) Appl. No.: 14/925,958

(22) Filed: Oct. 28, 2015

(65) Prior Publication Data

US 2017/0031597 A1 Feb. 2, 2017

Related U.S. Application Data

(63) Continuation-in-part of application No. 14/508,785, filed on Oct. 7, 2014, now Pat. No. 9,201,742, which is a continuation-in-part of application No. 14/299,566, filed on Jun. 9, 2014, now Pat. No. 9,002,871, which is a continuation-in-part of
(Continued)

(51) Int. Cl.
| | |
|---|---|
| *G06F 16/00* | (2019.01) |
| *G06F 3/06* | (2006.01) |
| *G06F 12/02* | (2006.01) |
| *G06F 16/27* | (2019.01) |
| *G06F 16/215* | (2019.01) |
| *G06F 16/23* | (2019.01) |

(52) U.S. Cl.
CPC .......... *G06F 3/0604* (2013.01); *G06F 3/0644* (2013.01); *G06F 3/0652* (2013.01); *G06F 3/0659* (2013.01); *G06F 3/0679* (2013.01); *G06F 12/023* (2013.01); *G06F 16/215* (2019.01); *G06F 16/2365* (2019.01); *G06F 16/27* (2019.01)

(58) Field of Classification Search
CPC ............ G06F 12/0253; G06F 12/0261; G06F 12/0269; G06F 12/0276
See application file for complete search history.

(56) References Cited

U.S. PATENT DOCUMENTS

| | | | |
|---|---|---|---|
| 6,199,075 B1 * | 3/2001 | Ungar | ................ G06F 12/0276 |
| 8,495,036 B2 * | 7/2013 | Calder | .............. G06F 17/30011 |
| | | | 707/696 |

(Continued)

OTHER PUBLICATIONS

Guy L. Steele Jr., "Multiprocessing Compactifying Garbage Collection", ADM, 1975, pp. 495-508, Communications of the ACM, Sep. 1975, vol. 18, No. 9.*

(Continued)

*Primary Examiner* — Cheryl Lewis

(57) ABSTRACT

In one aspect, a computerized-method of a distributed database includes the step of providing a first data partition with a set of data. The method includes the step of providing a second data partition with a replica of the first set of data. The method includes the step of identifying a client application accessing the first data partition and the second data partition. The method includes the step of performing a reclamation operation on the second data partition. The method includes the step of informing the client application that a read operation is prohibited during the reclamation operation.

10 Claims, 4 Drawing Sheets

Related U.S. Application Data application No. 13/451,551, filed on Apr. 20, 2012, now Pat. No. 8,799,248.

(60) Provisional application No. 61/478,940, filed on Apr. 26, 2011.

(56) References Cited

U.S. PATENT DOCUMENTS

| | | | |
|---|---|---|---|
| 9,411,873 B2* | 8/2016 | Rath | G06F 17/30575 |
| 2009/0210429 A1* | 8/2009 | Agrawal | G06F 17/30578 |
| 2016/0110105 A1* | 4/2016 | Karamcheti | G06F 3/061 |
| | | | 710/302 |

OTHER PUBLICATIONS

Timothy Harris, Citrix Systems Ltd, "Early Storage Reclamation in a Tracing Garbage Collector", ACM SIGPLAN Notices, Apr. 1999, pp. 46-53.*

* cited by examiner

METHODS AND SYSTEMS OF GARBAGE COLLECTION AND DEFRAGMENTATION IN A DISTRIBUTED DATABASE

CROSS-REFERENCE TO RELATED APPLICATIONS

This application hereby incorporates by reference in their entirety the following applications: U.S. patent application Ser. No. 14/508,785 filed on Oct. 7, 2014; U.S. patent application Ser. No. 14/299,566 filed on Jun. 9, 2014, and patented as U.S. Pat. No. 9,002,871; U.S. patent application Ser. No. 13/451,551 filed on Apr. 20, 2012, and patented as U.S. Pat. No. 8,799,248; and U.S. Provisional Patent Application No. 61/478,94 filed on Apr. 26, 2011.

FIELD OF THE INVENTION

The invention is in the field of database management and more specific all method, system and apparatus of methods and systems of garbage collection and defragmentation in a distributed database.

DESCRIPTION OF THE RELATED ART

Currently, defragmentation (and/or other data drive organization processes such as compacting, reclaiming data space, garbage collection, etc.) can be continually running on one or more drives of a database system. These processes can increase the read and/or write load of the drives. The increased load can also increase the latency of read operations and/or write operations. At the same time, replication techniques can be implement on the various data in the drives.

BRIEF SUMMARY OF THE INVENTION

In one aspect, a computerized-method of a distributed database includes the step of providing a first data partition with a set of data. The method includes the step of providing a second data partition with a replica of the first set of data. The method includes the step of identifying a client application accessing the first data partition and the second data partition. The method includes the step of performing a reclamation operation on the second data partition. The method includes the step of informing the client application that a read operation is prohibited during the reclamation operation.

Figure 1:
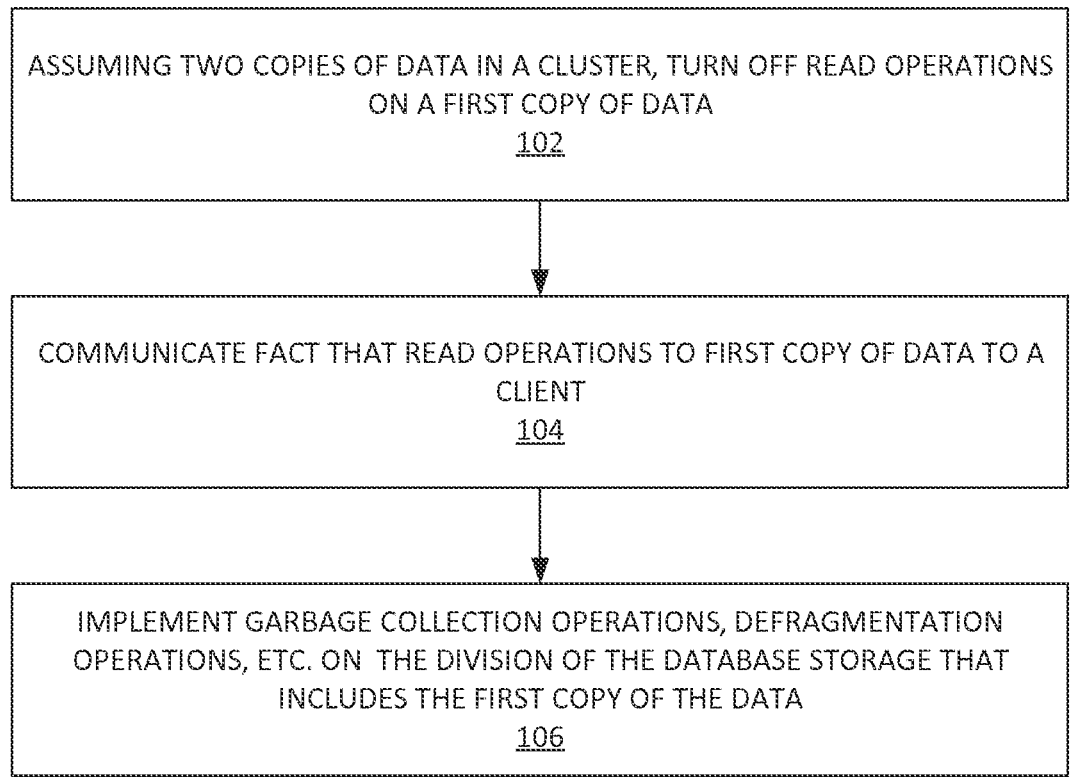
FIG. 1 illustrates an example process for garbage collection and defragmentation in a distributed database, according to some embodiments.

The Figures described above are a representative set, and are not an exhaustive set with respect to embodying the invention.

DESCRIPTION

Disclosed are a system, method, and article of manufacture for methods and systems of garbage collection and defragmentation in a distributed database. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to 'one embodiment,' an 'embodiment,' 'one example,' or similar language means that a particular feature, structure, or characteristic described in connection with the embodiment is included in at least one embodiment of the present invention. Thus, appearances of the phrases 'in one embodiment,' 'in an embodiment,' and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Defragmentation can be a process that reduces the amount of fragmentation. Defragmentation physically organizes the contents of a mass storage device used to store files into a smaller number of contiguous regions (e.g. fragments).

Drives can be data storage mechanisms where data are recorded by various electronic, magnetic, optical, or mechanical changes to a storage disks, solid-state drive (SSD), etc.

Flash drive can be a drive using flash memory.

Garbage collection(GC) can be a form of automatic memory management. A GC process can reclaim memory occupied by objects that are no longer in use by a program.

NoSQL "non SQL", "not only" and/or "non relational") database can provide a mechanism for storage and retrieval of data that is modeled in means other than the tabular relations used in relational databases.

Replication can include sharing information so as to ensure consistency between redundant resources, such as software or hardware components, to improve reliability, fault-tolerance, or accessibility.

Exemplary Methods

FIG. 1 illustrates an example process 100 for garbage collection and defragmentation in a distributed database, according to some embodiments. In the present example of process 100, it is assumed, for exemplary purposes, that two copies of data are in a cluster. In step 102, process 100 can turn off read operations to a first copy of the data. For example, read operations can be turned off for the drive that includes the first copy of data. In step 104, process 100 communicates fact that read operations to first copy of data to a client so client only reads from second copy of the data (e.g. the drive, other partitions and/or memory spaces, etc. with read operations still available). In step 106, process can implement GC, defragmentation, other clean-up operations, etc. on the division of the database storage that includes the first copy of the data (and not the second copy of the data). It is noted that process 100 is extensible to various divisions of database storage (e.g. disks, partitions, clusters, etc.). Write operations can be made to the database storage division associated with first copy of the data.

Additional Exemplary Computer Architecture and Systems

Figure 2:
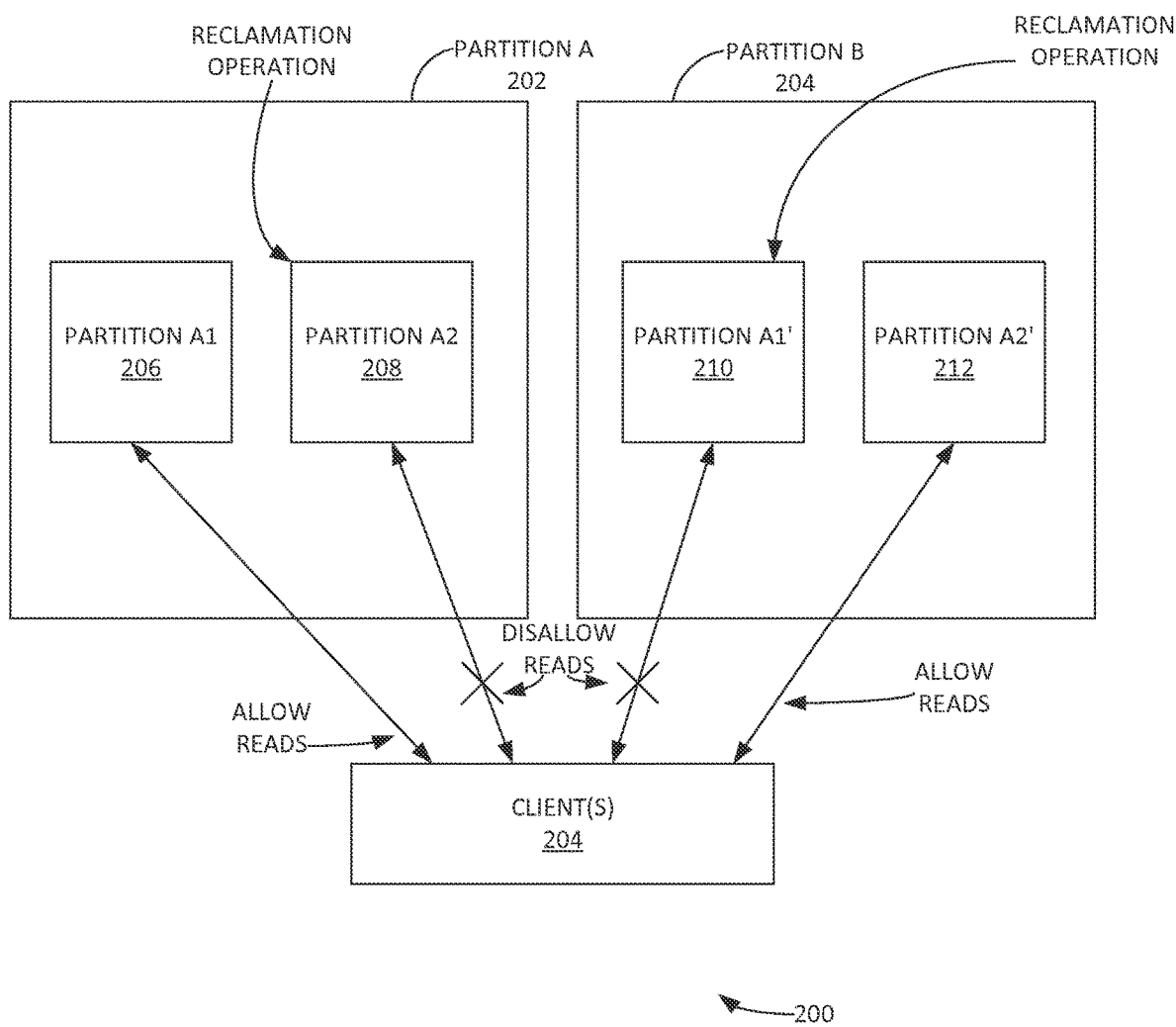
FIG. 2 illustrates an example system implementing garbage collection and defragmentation in a distributed database, according to some embodiments.

FIG. 2 illustrates an example system 200 implementing garbage collection and defragmentation in a distributed database (e.g. a flash-optimized in-memory NoSQL database, etc.), according to some embodiments. System 200 can be implemented by an Aerospike Database. The Aerospike Database can operate in three layers: a flash optimized data layer, a self-managed distribution layer and a cluster-aware client layer. The distribution layer can be replicated across data centers to ensure consistency. The replication can allows the database to remain operational when an individual server node fails or is removed from the cluster. The smart-client layer is used to track the cluster configuration in the database, and manages communications in the server node. The data layer can be optimized to store data in solid state drives, random-access memory (RAM), and/or traditional rotational media. The database indices can be stored in RAM for quick availability, and data writes are optimized through large block writes to reduce latency. The software can employs two sub-programs: a Defragmenter and Evictor (not shown). The Defragmenter can remove data blocks that have been deleted. The Evictor can frees RAM space by removing references to expired records.

More specifically, system 200 can include partitions 202 and 204. Data sub-partition 206 A1 can be replicated as data sub-partition 210 A1'. Data sub-partition 208 A2 can be replicated as data sub-partition 212 A2'. Sub-partitions 208 A2 and 210 A1' can undergo a reclamation operation (e.g. defragmentation, garbage collection, etc.). Client(s) 204 can be informed that read operations are not allowed to sub-partitions 208 A2 and 210 A1' for a specified period of time (e.g. during the reclamation operation, etc.). Read operations to other sub-partitions can continue. It is noted that write operations can still be allowed to all the data sub-partitions, even when a particular data sub-partition is not available for a read operation.

Figure 3:
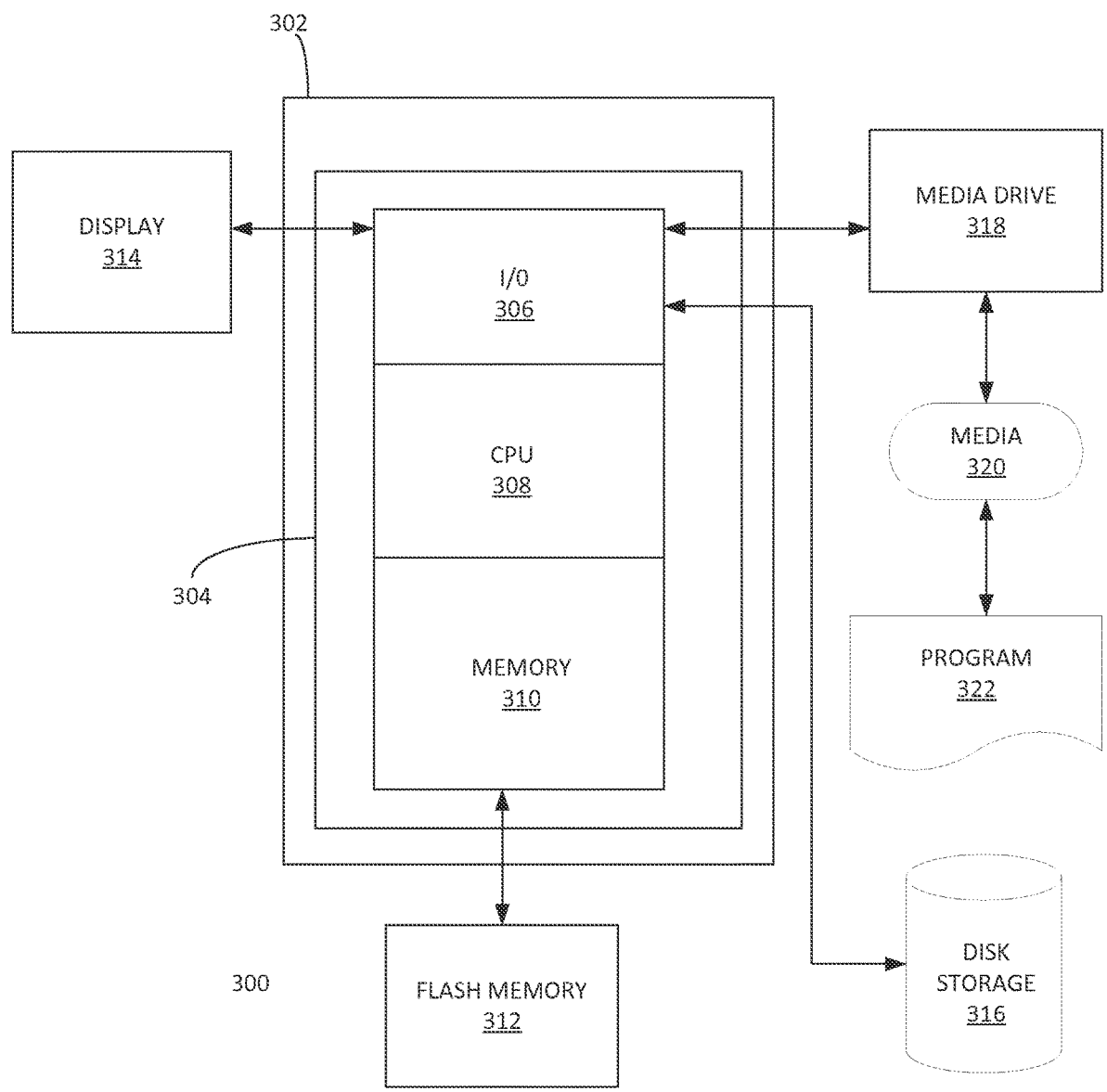
FIG. 3 depicts an exemplary computing system that can be configured to perform any one of the processes provided herein.

FIG. 3 depicts an exemplary computing system 300 that can be configured to perform any one of the processes provided herein. In this context, computing system 300 may include, for example, a processor, memory, storage, and I/O devices (e.g., monitor, keyboard, disk drive, Internet connection, etc.). However, computing system 300 may include circuitry or other specialized hardware for carrying out some or all aspects of the processes. In some operational settings, computing system 300 may be configured as a system that includes one or more units, each of which is configured to carry out some aspects of the processes either in software, hardware, or some combination thereof.

FIG. 3 depicts computing system 300 with a number of components that may be used to perform any of the processes described herein. The main system 302 includes a motherboard 304 having an I/O section 306, one or more central processing units (CPU) 308, and a memory section 310, which may have a flash memory card 312 related to it. The I/O section 306 can be connected to a display 314, a keyboard and/or other user input (not shown), a disk storage unit 316, and a media drive unit 318. The media drive unit 318 can read/write a computer-readable medium 320, which can contain programs 322 and/or data. Computing system 300 can include a web browser. Moreover, it is noted that computing system 300 can be configured to include additional systems in order to fulfill various functionalities. Computing system 300 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 4:
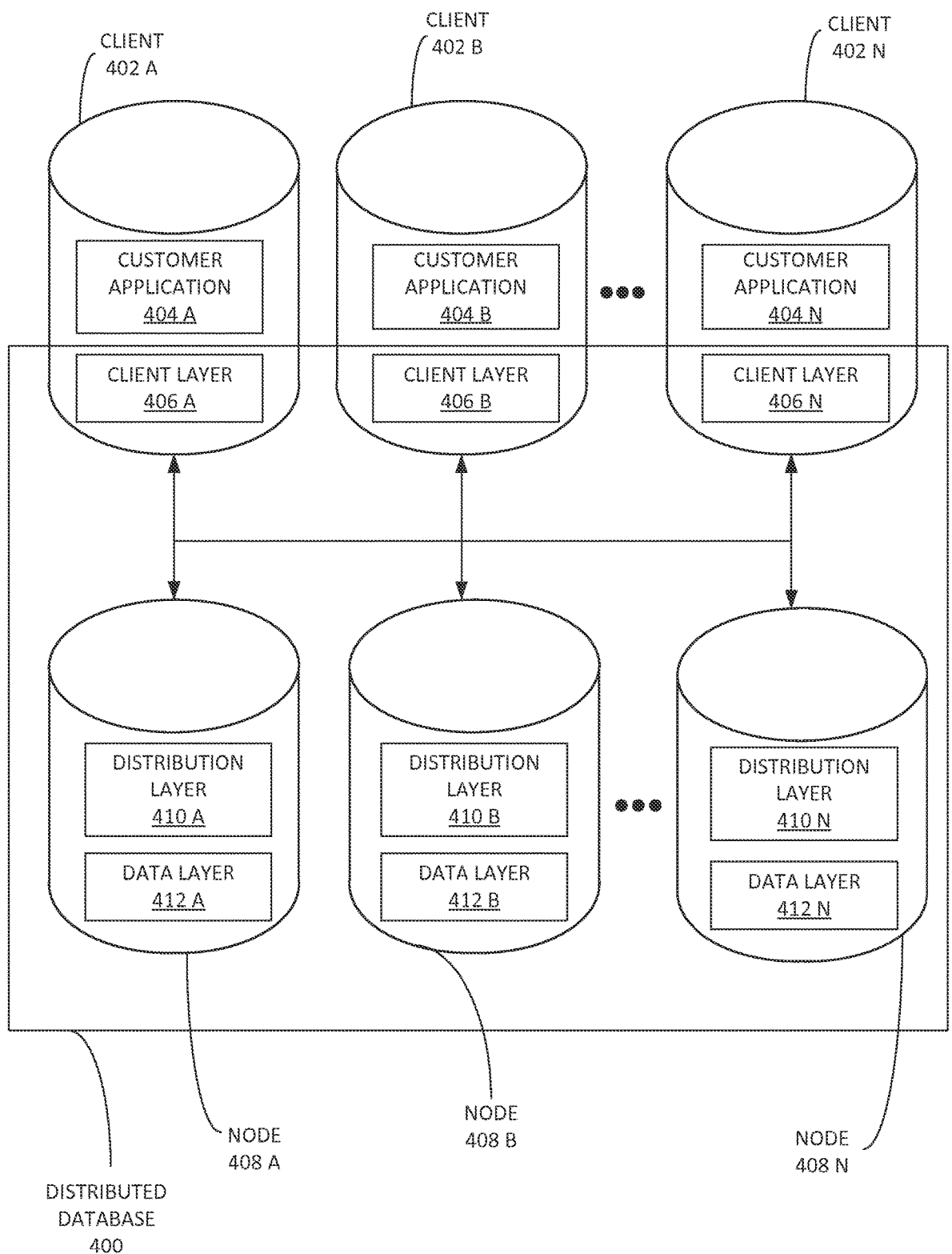
FIG. 4 shows, in a block diagram format, a distributed database system (DDBS) operating in a computer network according to an example embodiment.

FIG. 4 shows, in a block diagram format, a distributed database system (DDBS) 400 operating in a computer network according to an example embodiment. In some examples, DDBS 400 can be an Aerospike® database. DDBS 400 can typically be a collection of databases that can be stored at different computer network sites (e.g. a server node). Each database may involve different database management systems and different architectures that distribute the execution of transactions. DDBS 400 can be managed in such a way that it appears to the user as a centralized database.

DDBS 400 can be a distributed, scalable NoSQL database, according to some embodiments. DDBS 400 can include, inter alia, three main layers: a client layer 406 A-N, a distribution layer 410 A-N and/or a data layer 412 A-N. Client layer 406 A-N can include various DDBS client libraries. Client layer 406 A-N can be implemented as a smart client. For example, client layer 406 A-N can implement a set of DDBS application program interfaces (APIs) that are exposed to a transaction request. Additionally, client layer 406 A-N can also track cluster configuration and manage the transaction requests, making any change in cluster membership completely transparent to the customer application 404 A-N.

Distribution layer 410 A-N can be implemented as one or more server cluster nodes 408 A-N. Cluster nodes 408 A-N can communicate to ensure data consistency and replication across the cluster. Distribution layer 410 A-N can use a shared-nothing architecture. The shared-nothing architecture can be linearly scalable. Distribution layer 410 A-N can perform operations to ensure database properties that lead to the consistency and reliability of the DDBS 400. These properties can include Atomicity, Consistency, Isolation, and Durability.

Atomicity. A transaction is treated as a unit of operation. For example, in the case of a crash, the system should complete the remainder of the transaction, or it may undo all the actions pertaining to this transaction. Should a transaction fail, changes that were made to the database by it are undone (e.g. rollback).

Consistency. This property deals with maintaining consistent data in a database system. A transaction can transform the database from one consistent state to another. Consistency falls under the subject of concurrency control.

Isolation. Each transaction should carry out its work independently of any other transaction that may occur at the same time.

Durability. This property ensures that once a transaction commits, its results are permanent in the sense that the results exhibit persistence after a subsequent shutdown or failure of the database or other critical system. For example, the property of durability ensures that after a COMMIT of a transaction, whether it is a system crash or aborts of other transactions, the results that are already committed are not modified or undone.

In addition, Distribution layer 410 A-N can ensure that the cluster remains fully operational when individual server nodes are removed from or added to the cluster. On each server node, a data layer 412 A-N can manage stored data on disk. Data layer 412 A-N can maintain indices corresponding to the data in the node. Furthermore, data layer 412 A-N be optimized for operational efficiency, for example, indices can be stored in a very tight format to reduce memory requirements, the system can be configured to use low level access to the physical storage media to further improve performance and the likes. It is noted, that in some embodiments, no additional cluster management servers and/or proxies need be set up and maintained other than those depicted in FIG. 4.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

What is claimed as new and desired to be protected by Letters Patent of the United States is:

1. A computerized-method of a distributed database comprising:
   providing a first data partition with a first set of data;
   providing a second data partition with a replica of the first set of data;
   identifying a client application accessing the first data partition and the second data partition, wherein the client application is allowed to implement a write operation to the second partition during a reclamation operation;
   performing the reclamation operation on the second data partition, wherein the reclamation operation comprises a garbage collection operation on the second data partition, wherein the reclamation operation comprises a defragmentation operation; and
   informing the client application that a read operation is prohibited during the reclamation operation, and
   wherein the distributed database comprises a flash-optimized in-memory not-only SQL (NoSQL) database.

2. The computerized-method of claim 1, wherein the first data partition comprises a solid-state device drive.

3. The computerized-method of claim 2, wherein the second data partition comprises another solid-state device drive.

4. The computerized-method of claim 2 further comprising:
   determining that the reclamation operation has finished.

5. The computerized-method of claim 4 further comprising;
   communicating to the client application that the read operation to the second partition is allowed.

6. A computerized system comprising:
   at least one processor configured to execute instructions;
   at least one memory containing instructions when executed on the processor, causes the processor to perform operations that:
   provide a first data partition with a first set of data;
   provide a second data partition with a replica of the first set of data;
   identify a client application accessing the first data partition and the second data partition;
   implement a reclamation operation on the second data partition, wherein the reclamation operation comprises a defragmentation operation on the second data partition; and
   inform the client application that read operations to the second partition are prohibited during the reclamation operation, and
   wherein the distributed database comprises a flash-optimized in-memory not-only SQL (NoSQL) database.

7. The computerized-system of claim 6, wherein the client application is allowed to implement a write operation to the second partition during the reclamation operation.

8. The computerized-system of claim 7, wherein the reclamation operation comprises a garbage collection operation.

9. The computerized-system of claim 8, wherein the first data partition comprises a solid-state device drive.

10. The computerized-system of claim 9, wherein the second data partition comprises another solid-state device drive.

* * * * *